United States Patent
Kurahashi

(10) Patent No.: US 11,523,042 B2
(45) Date of Patent: Dec. 6, 2022

(54) IMAGE DETECTION DEVICE

(71) Applicant: MITUTOYO CORPORATION, Kanagawa (JP)

(72) Inventor: Yuki Kurahashi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 46 days.

(21) Appl. No.: 17/012,262

(22) Filed: Sep. 4, 2020

(65) Prior Publication Data

US 2021/0075955 A1  Mar. 11, 2021

(30) Foreign Application Priority Data

Sep. 10, 2019  (JP) .............................. JP2019-164434

(51) Int. Cl.
*H04N 5/232* (2006.01)
*H05B 47/105* (2020.01)
*G02F 1/29* (2006.01)

(52) U.S. Cl.
CPC ........... *H04N 5/23212* (2013.01); *G02F 1/29* (2013.01); *H05B 47/105* (2020.01); *G02F 1/294* (2021.01)

(58) Field of Classification Search
CPC .... H04N 5/23212; H05B 47/105; G02F 1/29; G02F 1/294
See application file for complete search history.

(56) References Cited

U.S. PATENT DOCUMENTS

2018/0180774 A1* 6/2018 Nagahama ............... G02B 3/14

FOREIGN PATENT DOCUMENTS

JP  2018-189702  11/2018

* cited by examiner

*Primary Examiner* — Twyler L Haskins
*Assistant Examiner* — Fayez A Bhuiyan
(74) *Attorney, Agent, or Firm* — Greenblum & Bernstein, P.L.C.

(57) ABSTRACT

An image detection device includes a liquid resonant lens system whose focal point is cyclically changeable; an image detector configured to detect a detection image in a to-be-imaged region through the lens system; a pulsed illuminator configured to emit pulsed light on the to-be-imaged region in synchronization with the focal point; and an illumination controller configured to increase or decrease an illumination duration of the pulsed illuminator depending on a required light volume of the to-be-imaged region at the focal point where the pulsed illuminator emits pulsed light.

7 Claims, 6 Drawing Sheets

| IMAGE PICKUP SURFACE (FOCAL POINT) | PHASE ANGLE POSITION | ILLUMINATION TIMING | ILLUMINATION DURATION (LIGHT VOLUME) |
|---|---|---|---|
| #1 | $\theta 1$ | Td1 | Tw1 |
| #2 | $\theta 2$ | Td2 | Tw2 |
| #3 | $\theta 3$ | Td3 | Tw3 |
|  |  |  |  |

IMAGE DETECTION DEVICE

The entire disclosure of Japanese Patent Application No. 2019-164434 filed Sep. 10, 2019 is expressly incorporated by reference herein.

TECHNICAL FIELD

The present invention relates to an image detection device.

BACKGROUND ART

A variable focal length lens in a form of a liquid resonant lens system has been developed. An image detection device in which this lens system is combined with a pulsed illumination device has been developed to detect an image in focus at a desired position of a target (Patent Literature 1: JP2018-189702 A).

The liquid resonant lens system generates a standing wave in an internal liquid by a cyclic drive signal to cyclically change a focal point as a lens.

The image detection device is configured to apply a pulsed illumination in synchronization with a predetermined phase angle of the drive signal for driving the lens system, thereby detecting an image on a to-be-imaged surface that coincides with a focal point corresponding to the predetermined phase angle. The image detection device can detect a multi-focus image of the target by setting a plurality of phase angles to be synchronized with the pulsed illumination in one cycle.

The image detection device described above requires a light volume of the pulsed illumination to be adjusted depending on a surface condition appearing on the to-be-imaged surface of the target.

For instance, when the target is an IC chip, the IC chip has a less reflective surface such as a black resin package surface and a highly reflective surface such as a metallic pin for wiring. For this reason, a typical illumination with a constant light volume causes a problem that a clear image cannot be obtained on the less reflective surface and overexposure occurs on the highly reflective surface.

Accordingly, when the focal point changes, it is required to increase or decrease the light volume of the pulsed illumination depending on a state of the to-be-imaged surface that coincides with the focal point. Particularly, for detection of a multi-focus image, it is required to increase or decrease the light volume of the pulsed illumination at a plurality of focal points.

However, in the liquid resonant lens system used in the image detection device, a resonance frequency of the liquid serving as the lens is as high as several tens of kilohertz, and an illumination timing interval is an extremely short time of a microsecond order. If the interval of the illumination timing is short, it becomes difficult to control the increase or decrease of the illumination light volume depending on the focal points.

Further, in the liquid resonant lens system, an illumination duration of the pulsed illumination is shortened to a nanosecond order in order to minimize a change in the focal point at the time of detecting the image. In order to securely obtain the illumination light volume in such an extremely short time, it is preferable to maintain the volume of the pulsed illumination constantly at the maximum level, in other words, not to decrease the light volume. Also in this regard, it is difficult to adjust (i.e. increase or decrease) the light volume of the pulsed illumination.

The above difficulty of adjusting the light volume of the pulsed illumination becomes more eminent in the multi-focus image detection in which the pulsed illumination is densely performed at a plurality of focal points.

SUMMARY OF THE INVENTION

An object of the invention is to provide an image detection device capable of easily adjusting a light volume of pulsed illumination in synchronization with a liquid resonant lens system.

According to an aspect of the invention, an image detection device includes: a liquid resonant lens system whose focal point is cyclically changeable to define a plurality of focal points; an image detector configured to detect an image of a to-be-imaged region through the lens system; a pulsed illuminator configured to emit pulsed light on the to-be-imaged region in synchronization with at least one of the plurality of focal points; and an illumination controller configured to increase or decrease an illumination duration of the pulsed illuminator depending on a required light volume for the to-be-imaged region at the at least one of the plurality of focal points where the pulsed illuminator emits the pulsed light.

In the above aspect of the invention, the light volume used for the pulsed illumination is adjustable by increasing or decreasing the illumination duration. In other words, even with the pulsed illuminator whose output is constant, the cumulative light volume can be increased and decreased by shortening and prolonging the illumination duration, respectively.

Accordingly, the light volume of the pulsed illuminator can be easily adjusted based on the operation duration from the illumination start to the illumination stop without requiring a difficult process of adjusting the output of the pulsed illuminator in an extremely short time.

Further, since the light volume can be adjusted based on the illumination duration even with the constant output of the pulsed illuminator, the mechanism of the pulsed illumination device can be simplified, contributing to reliability and cost reduction.

In the image detection device with the above arrangement, the illumination controller may be configured to control the pulsed illuminator to emit the pulsed light at the plurality of focal points, and increase or decrease the illumination duration of the pulsed illuminator depending on the required light volume for the to-be-imaged region at each of the plurality of focal points.

In the above arrangement, a multi-focus image of a target can be detected and the light volume at each focal point can be suitably adjusted. For the detection of the multi-focus image, it is required to adjust the light volume of the pulsed illuminator in an extremely short time. The light volume adjustment, which is done through adjustment of the illumination duration instead of the output adjustment in the above arrangement, can be relatively easily performed by a digital signal control device such as a microcomputer or an FPGA (Field-Programmable Gate Array).

In the image detection device with the above arrangement, illumination actions for the plurality of focal points by the illumination controller may be performed in different cycles respectively having the plurality of focal points.

In the above arrangement, the time interval between the illumination actions can be extended and the illumination action can be reliably and stably operated as compared with a case where all the illumination actions for the plurality of focal points are set in a single cycle.

In the image detection device with the above arrangement, the illumination controller may include illumination information storing the required light volume for the to-be-imaged surface at each of the focal points, and may be configured to adjust the illumination duration with reference to the illumination information when making the pulsed illuminator emit the pulsed light.

In the above arrangement, the required light volume for each focal point, which is stored in advance, can be more speedily obtained than detecting the required light volume at each time of illumination.

According to another aspect of the invention, an image detection device includes: a liquid resonant lens system whose focal point is cyclically changeable to define a plurality of focal points; an image detector configured to detect an image of a to-be-imaged region through the lens system; a pulsed illuminator configured to emit pulsed light on the to-be-imaged region in synchronization with at least one of the plurality of focal points; and an image detection controller configured to increase or decrease the number of illumination of the pulsed illuminator within a period for the image detector to detects the image in one frame depending on a required light volume for the to-be-imaged region at the at least one of the plurality of focal points where the pulsed illuminator emits the pulsed light.

In the above aspect of the invention, the light volume used for the pulsed illumination is adjustable by increasing or decreasing the number of the pulsed illumination for the image detection. In other words, even when the light volume of the pulsed illumination for a single time is constant, a cumulative light volume to be obtained can be increased or decreased by increasing or decreasing the number of the pulsed illumination within the period for the image detector to detect the image for a single frame.

Accordingly, the light volume of the pulsed illuminator can be easily adjusted by adjusting the detection duration of the images for one frame without requiring the difficult process for adjusting the output of the pulsed illuminator in an extremely short time.

Further, since the output of the pulsed illuminator can be made constant, the pulsed illumination can always be maintained at the maximum light intensity, which enables to minimize a change in the focal point at the image detection using the liquid resonant lens system.

An object of the invention is to provide an image detection device capable of easily adjusting a light volume of pulsed illumination in synchronization with a liquid resonant lens system.

BRIEF EXPLANATION OF DRAWINGS

FIG. 4 shows illumination information in the first exemplary embodiment.

DESCRIPTION OF EMBODIMENT(S)

Exemplary embodiments of the invention will be described below with reference to the attached drawings.

First Exemplary Embodiment

Figure 1:
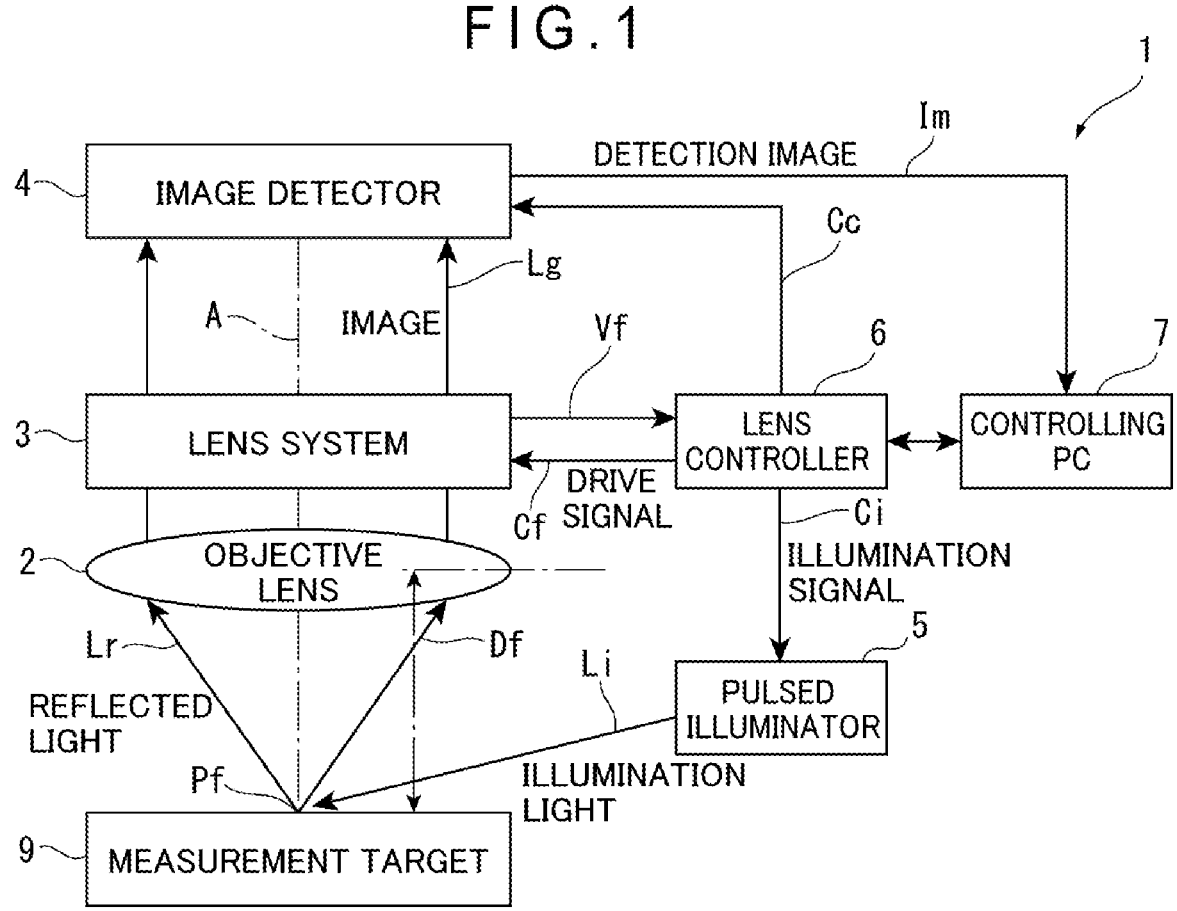
FIG. 1 is a block diagram showing an overall configuration according to a first exemplary embodiment of the invention.

FIG. 1 shows an overall configuration of an image detection device 1 according to a first exemplary embodiment of the invention.

The image detection device 1, which is configured to detect an image of a surface of a measurement target 9 placed in a to-be-imaged region at a focal length that is cyclically changed, includes an objective lens 2, a lens system 3 and an image detector 4 that are placed on the same optical axis A intersecting the surface.

Further, the image detection device 1 includes: a pulsed illuminator 5 configured to emit pulsed light on the surface of the measurement target 9; a lens controller 6 configured to control operations of the lens system 3 and the pulsed illuminator 5; and a controlling PC 7 configured to operate the lens controller 6.

The objective lens 2 is in a form of an existing convex lens.

The lens system 3, which is a variable focal length lens of a liquid resonance type, is configured to change a refractive index in response to a drive signal Cf inputted from the lens controller 6. The drive signal Cf is a sinusoidal alternating-current (AC) signal of a frequency generating a standing wave in the lens system 3.

In the image detection device 1, a focal length Df to a focal point Pf can be changed as needed based on a focal length of the objective lens 2 by changing the refractive index of the lens system 3.

In the image detection device 1, the drive signal Cf is a sinusoidal AC signal, and the focal point Pf and the focal length Df are also cyclically and sinusoidally changeable.

In this configuration, when the image detection device 1 emits pulsed light on the measurement target 9 present at the focal point Pf at a desired point in an oscillation waveform of the focal point Pf and detects the image illuminated at that time, the image of the measurement target 9 at the focal point Pf can be obtained.

The image detector 4, which is exemplified by an existing CCD (Charge Coupled Device) image sensor or a camera of some other sorts, can output an incident image Lg to the controlling PC 7 as a detection image Im in a predetermined signal format.

The pulsed illuminator 5 in a form of a light emitting device such as LED (Light Emitting Diode) can emit pulsed light on the surface of the measurement target 9 by emitting an illumination light Li for a predetermined duration when an illumination signal Ci is inputted from the lens controller 6.

In the image detection device 1, the drive of the lens system 3, the illumination of the pulsed illuminator 5 and the image detection of the image detector 4 are controlled in accordance with the drive signal Cf, the illumination signal Ci and an image detection signal Cc from the lens controller 6, respectively. The controlling PC 7 is connected to the lens controller 6 in order to adjust settings and the like of the lens controller 6 for performing the above control.

Figure 2:
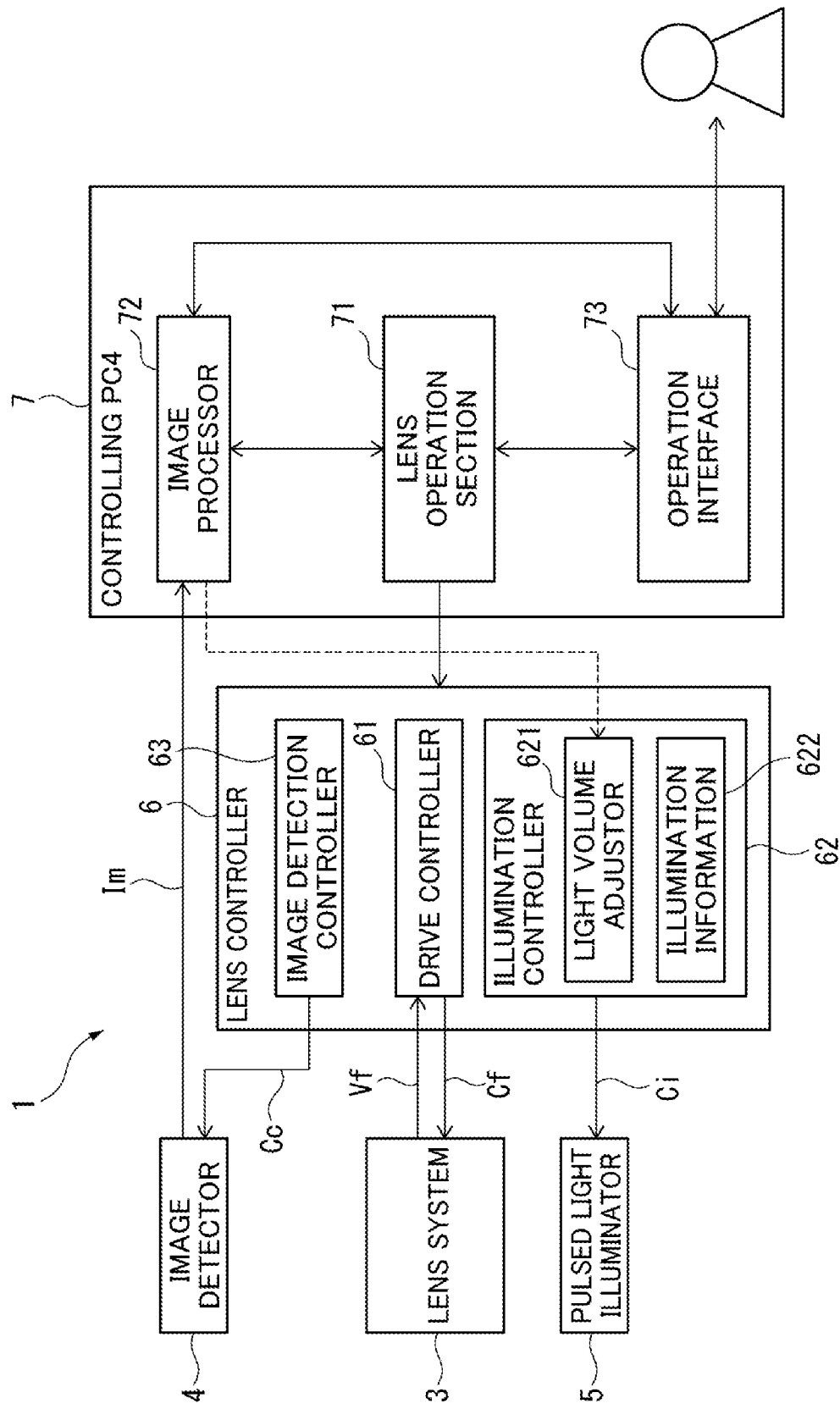
FIG. 2 is a block diagram showing a relevant part in the first exemplary embodiment.

FIG. 2 shows the configuration of the lens controller 6 and the controlling PC 7 in the exemplary embodiment.

The lens controller 6, which is a dedicated unit in a form of hardware for controlling operations of the lens system 3 and the pulsed illuminator 5, includes: a drive controller 61 configured to output the drive signal Cf to the lens system 3; an illumination controller 62 configured to output the illumination signal Ci to the pulsed illuminator 5; and an image detection controller 63 configured to output the image detection signal Cc to the image detector 4.

While outputting the drive signal Cf to the lens system 3, the drive controller 61 detects an oscillation state Vf of the lens system 3 based on an effective power or drive current applied to the lens system 3 when the lens system 3 oscillates in response to the drive signal Cf. By adjusting the frequency of the drive signal Cf with reference to the oscillation state Vf of the lens system 3, the drive controller 61 can lock the lens system 3 at the current resonance frequency.

The illumination controller 62 outputs the illumination signal Ci to the pulsed illuminator 5 to emit pulsed light on the measurement target 9 in the to-be-imaged region. An illumination timing of the illumination signal Ci is synchronized with the drive signal Cf and set at a predetermined phase angle relative to the focal point Pf.

The image detection controller 63 outputs an image detection signal Cc to the image detector 4 to control ON or OFF of the image detection. The detection image Im in one frame detected by the image detector 4 during a period from the image detection ON (i.e. the time when the image detection is switched on) to the image detection OFF (i.e. the time when the image detection is switched off) is transmitted to the controlling PC 7 to be processed.

In the exemplary embodiment, the output of the image detection signal Cc is continued for a predetermined period, during which the measurement target 9 is pulse-illuminated at a predetermined position (i.e. a phase angle in the cycle of change) of the focal point Pf for a plurality of timings, whereby images at the focal points Pf at the illumination timings are detected. The illumination signal Ci specifying the illumination timings is defined so that the light is emitted at a plurality of timings within a variable range of the focal point Pf, thereby allowing detection of a multi-focus image in which a plurality of images focused at the focal points Pf are superimposed.

The controlling PC 7 includes: a lens operation section 71 for operating various setting operations to the lens controller 6; an image processor 72 configured to import and process the detection image Im from the image detector 4; and an operation interface 73 for allowing a user's operation to the image detection device 1.

The controlling PC 7, which is a general-purpose personal computer, runs dedicated software to achieve the intended functions. Specifically, the function of the lens operation section 71 that controls the lens controller 6 is achieved by running the lens operation software. Moreover, the function of the image processor 72 that processes the detection image Im from the image detector 4 is achieved by running image processing software. The lens operation software and the image processing software can be operated by the user through the operation interface 73 using a display screen and an input device of the controlling PC 7.

The illumination controller 62 in the exemplary embodiment includes a light volume adjustor 621 configured to increase or decrease an illumination duration of the pulsed illuminator 5 depending on a required light volume for the to-be-imaged region at the focal point where the pulsed illuminator 5 emits light.

The light volume adjustor 621 uses, as the required light volume for the to-be-imaged region, the required light volume for the detection image Im at a predetermined focal point Pf among the detection images Im of the measurement target 9 obtained by the image processor 72 of the controlling PC 7.

Specifically, the image processor 72, which evaluates an image brightness of the detection image Im detected at the predetermined focal point Pf to judge excess or deficiency of the light volume to calculate the required light volume, is configured to transmit the calculated required light volume to the light volume adjustor 621.

Figure 3:
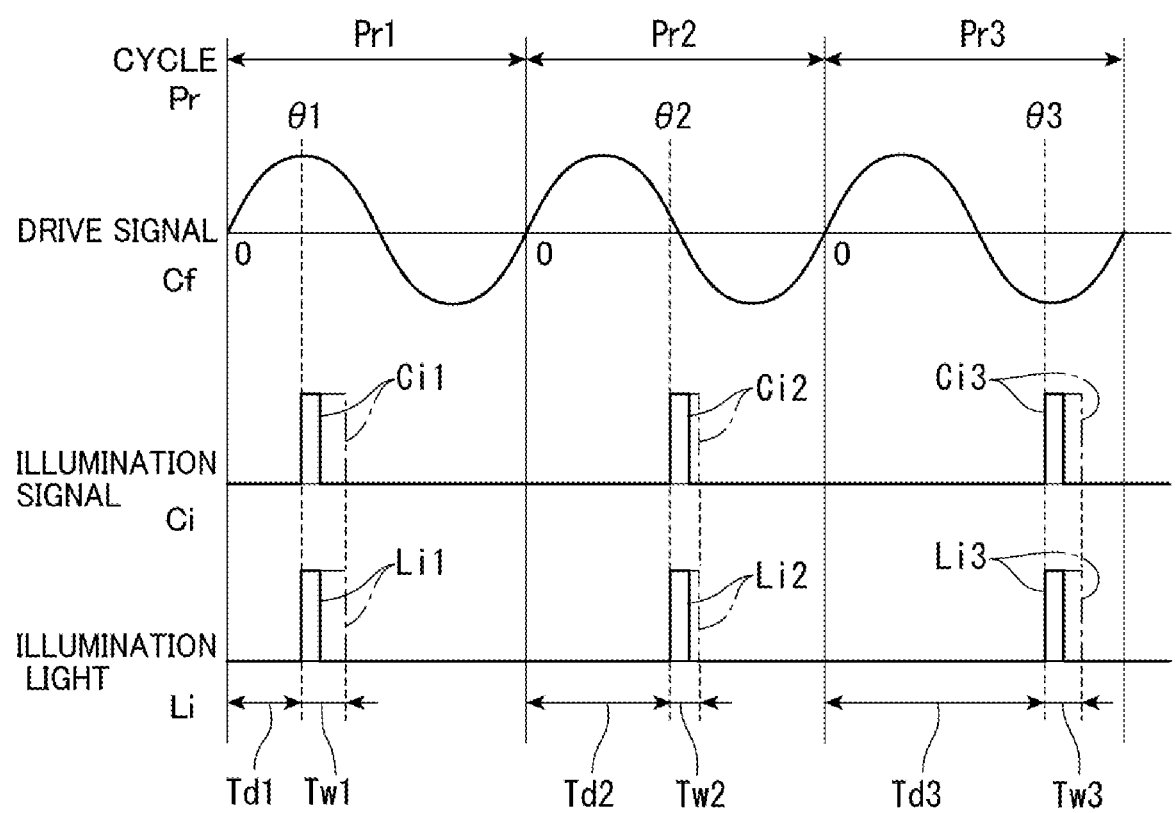
FIG. 3 shows operation timings in the first exemplary embodiment.

As shown in FIG. 3, the illumination signal Ci transmitted from the illumination controller 62 to the pulsed illuminator 5 is synchronized with a predetermined phase angle θ (e.g., θ1, θ2, θ3) in a cycle Pr (e.g., Pr1, Pr2, Pr3) of the basic drive signal Cf. Each phase angle θ has an illumination timing Td (e.g., Td1, Td2, Td3) corresponding to the predetermined focal point Pf.

The illumination signal Ci is kept being outputted for a predetermined illumination duration Tw (e.g., Tw1, Tw2, Tw3) starting from the illumination timing Td.

The illumination duration Tw is increased or decreased by the light volume adjustor 621 depending on the required light volume of the detection image Im at the focal point Pf corresponding to each phase angle θ, in other words, the required light volume depending on a surface condition of the measurement target 9.

An illumination light Li, which is emitted by the pulsed illuminator 5 in response to the illumination signal Ci, is kept being emitted for the illumination duration Tw from the illumination timing Td. A light volume of the illumination light Li per cycle Pr reaches a cumulative light volume for the illumination duration Tw.

Accordingly, when the illumination duration Tw is adjusted depending on the surface condition of the measurement target 9, the illumination light Li having a light volume suitable for the surface condition of the measurement target 9 can be obtained.

The output of the illumination light Li is set to be equal to the maximum output of the pulsed illuminator 5 so as to minimize a time for obtaining the predetermined light volume. As described above, the light volume of the illumination light Li, which is adjusted by increasing or decreasing the illumination duration Tw, can be suitably adjusted even when the pulsed illuminator 5 is fixed at the maximum output.

In the exemplary embodiment, as described above, a multi-focus image in which a plurality of images focused on different focal points Pf are superimposed can be detected.

In order to adjust the light volume of the illumination light Li for each of the plurality of images focused on such different focus positions Pf by increasing or decreasing the illumination duration Tw as described above, the illumination controller 62 sets illumination information 622 per focal point Pf.

As shown in FIG. 4, the phase angle θ (e.g., θ1, θ2, θ3), the illumination timing Td (e.g., Td1, Td2, Td3), and the illumination duration Tw (e.g., Tw1, Tw2, Tw3) in the cycle Pr of each of the to-be-imaged surface are set in the illumination information 622 for each of to-be-imaged surfaces (e.g., #1, #2, #3) having different focal points Pf.

The user operates the controlling PC 7 to specify a desired focal point Pf on the to-be-imaged surface, whereby the corresponding phase angle θ and illumination timing Td are set in the illumination controller 62. The illumination duration Tw is set by the light volume adjustor 621 in accordance with the required light volume for the specified to-be-imaged surface.

For the setting of the illumination duration Tw by the light volume adjustor 621, a test illumination operation may be performed on a plurality of to-be-imaged surfaces specified in advance, and the illumination duration Tw for obtaining an appropriate light volume on each to-be-imaged surface may be determined. Alternatively, each time a to-be-imaged surface is added at another focal point Pf, a test illumination operation may be performed to obtain the illumination duration Tw that gives an appropriate light volume. Further, during the pulsed illumination operation, the test illumination operation may be periodically performed to obtain a required light volume for the currently set to-be-imaged surface.

Although the illumination controller 62 may perform a plurality of illumination actions in each cycle Pr of the drive signal Cf when detecting a multi-focus image in which a plurality of images focused at different focal points Pf are superimposed, the illumination controller 62 in the exemplary embodiment distributes the illumination actions in respective different cycles Pr of the drive signal Cf.

As shown in FIG. 3, a to-be-imaged surface (to-be-imaged surface #1 in FIG. 4) of the focal point Pf having a phase angle θ1 is allocated to a first cycle Pr1, where an illumination timing Td1 corresponding to the phase angle θ1 and the illumination duration Tw1 required for the to-be-imaged surface are set for the illumination actions.

Similarly, the to-be-imaged surfaces (to-be-imaged surfaces #2, #3 in FIG. 4) having the respective phase angles θ2, θ3 are allocated to cycles Pr2, Pr3, where the illumination timings Td2, Td3 and the illumination duration Tw2, Tw3 are set for the illumination actions, respectively.

The distribution of the illumination actions in different cycles Pr, which increases the entire to-be-imaged time on the one hand, allows a sufficient time for each illumination action interval, resulting in stable and reliable operations.

According to the first exemplary embodiment described above, the following effects are obtainable.

In the exemplary embodiment, the light volume of the illumination light Li used for the pulsed illumination is adjustable by increasing or decreasing the illumination duration Tw. In other words, even when the output of the pulsed illuminator 5 is constant, the cumulative light volume can be increased and decreased by shortening and prolonging the illumination duration Tw, respectively.

Accordingly, the adjustment of the light volume by increasing or decreasing the illumination duration Tw is less difficult than the adjustment of the output of the pulsed illuminator 5 in a micro time, and the light volume can be easily adjusted based on the operation duration (illumination duration Tw) from the start (illumination timing Td) to the end of the illumination.

Further, since the light volume is adjustable in terms of the illumination duration Tw even when the output of the pulsed illuminator 5 is constant, the volume of the pulsed light can always be maintained at the maximum level, which enables to minimize a change in the focal point Pf at the image detection using the liquid resonance type lens system 3.

In the exemplary embodiment, the pulsed illuminator 5 is configured to emit light to a plurality of focus positions Pf, and for each of the to-be-imaged surfaces at the plurality of focal points Pf, the illumination duration Tw of the pulsed illuminator 5 is increased or decreased depending on the required light volume for the measurement target 9 in the to-be-imaged region.

Therefore, according to the exemplary embodiment, a multi-focus image of the measurement target 9 can be detected as the detection image Im and the light volume at each focal point Pf can be suitably adjusted. For detection of a multi-focus image, it is necessary to adjust the light volume of the pulsed illuminator 5 in an extremely short time. Since the light volume is sufficiently adjustable in the present exemplary embodiment by adjusting the illumination duration Tw instead of the output adjustment, the light volume is sufficiently adjustable in an extremely short time.

Particularly, since the respective illumination actions for the plurality of focal points Pf are determined to be performed in the cycles Pr having different focal points Pf in the exemplary embodiment, the time interval between the illumination actions can be extended and the illumination action can be reliably and stably done as compared with a case where all the illumination actions for the plurality of focal points Pf are set in a single cycle Pr.

In the exemplary embodiment, the illumination information 622 storing the required light volume for the to-be-imaged surface at each focal point Pf is provided and, for illumination of the pulsed illuminator 5, the illumination duration Tw is adjustable with reference to the illumination information 622. Accordingly, the required light volume at each focal point Pf can be stored in advance in terms of the illumination duration Tw, so that the required light volume can be more speedily obtained than detecting the required light volume at each time of illumination.

Second Exemplary Embodiment

Figure 5:
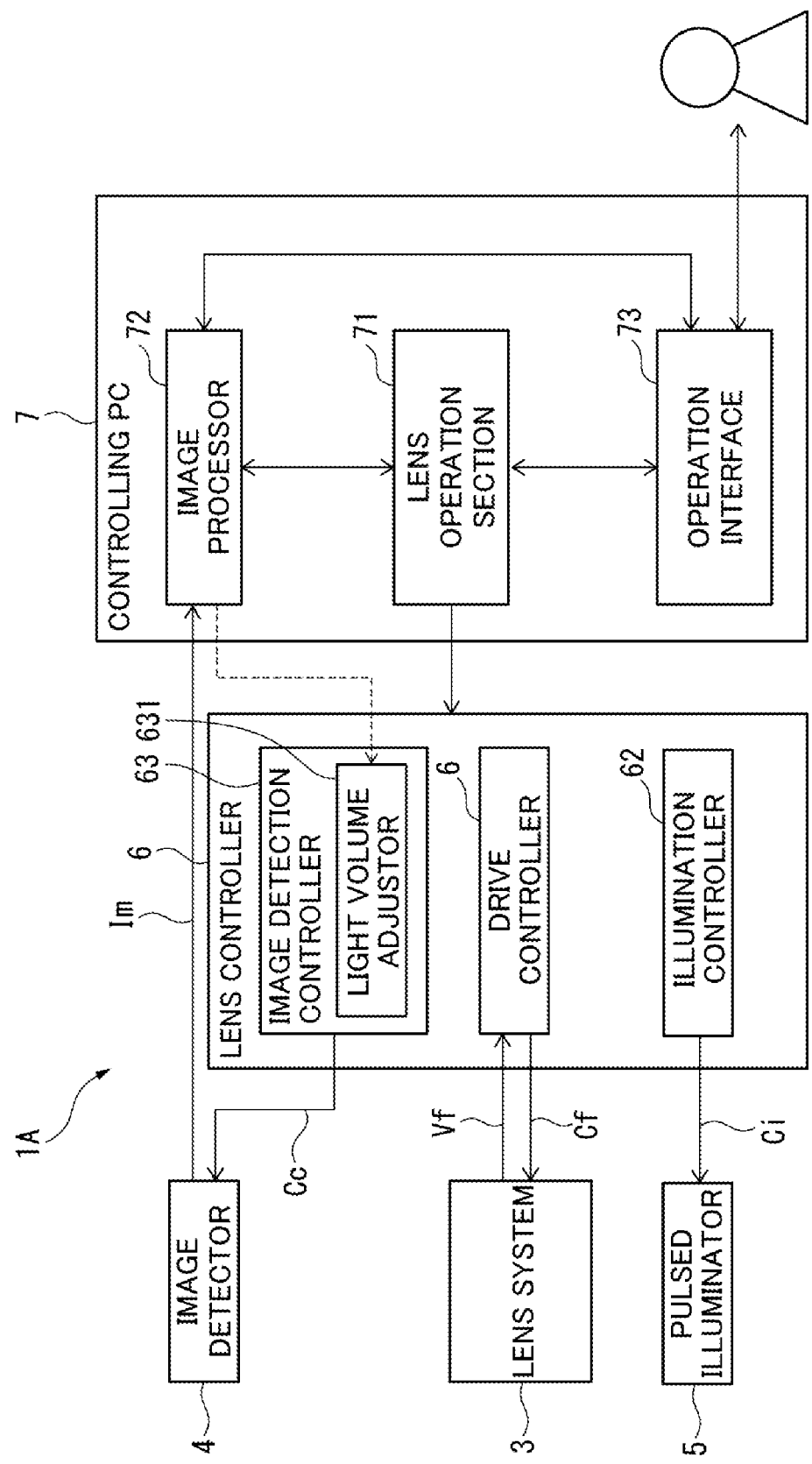
FIG. 5 is a block diagram showing a relevant part in a second exemplary embodiment of the invention.

FIG. 5 shows a relevant part of an image detection device 1A according to a second exemplary embodiment of the invention.

The image detection device 1 in the first exemplary embodiment, in which the light volume adjustor 621 is provided in the illumination controller 62, is configured to obtain the required light volume for the detection image im of the measurement target 9 in the to-be-imaged region by increasing or decreasing the illumination duration Tw of the illumination light Li by the pulsed illuminator 5.

In contrast, the image detection device 1A in the second exemplary embodiment as shown in FIG. 5, in which a light volume adjustor 631 is provided in the image detection controller 63, is configured to obtain the light volume required depending on the measurement target 9 in the to-be-imaged region by increasing or decreasing the detection time for one frame of the detection image Im in the image detector 4.

As shown in FIG. 5, the illumination controller 62 outputs the illumination signal Ci to the pulsed illuminator 5 to emit the pulsed light on the measurement target 9 in the to-be-imaged region. An illumination timing of the illumination signal Ci is synchronized with the drive signal Cf and set at a predetermined phase angle relative to the focal point Pf.

The illumination light Li is configured to be emitted from the pulsed illuminator 5 in response to the illumination signal Ci always at the same output and for the same illumination duration.

The image detection controller 63 outputs the image detection signal Cc to the image detector 4, controls whether the image detection is ON or OFF, and detects the detection image Im in one frame during a period from the image detection ON to the image detection OFF.

The image detection controller 63 includes the light volume adjustor 631 configured to increase or decrease the number of the illumination of the pulsed illuminator 5 performed in one frame of the images detected by the image detector 4, depending on the required light volume for the to-be-imaged region at the focal point where the pulsed illuminator 5 emits light.

The light volume adjustor 631 uses, as the required light volume for the to-be-imaged region, the required light volume for the detection image Im at the predetermined focal point Pf among the detection images Im of the measurement target 9 obtained by the image processor 72 of the controlling PC 7.

Specifically, the image processor 72, which evaluates brightness of the detection image Im detected at the predetermined focal point Pf to judge excess or deficiency of the light volume to calculate the required light volume, is configured to transmit the calculated required light volume to the light volume adjustor 631.

The light volume adjustor 631 is configured to increase or decrease the number of light emission, which is performed by the pulsed illuminator 5 for the duration of the output of the image detection signal Cc (i.e., a time from the image detection ON to the image detection OFF), by increasing or decreasing the number of a start timing and the duration of the output of the image detection signal Cc.

Figure 6:
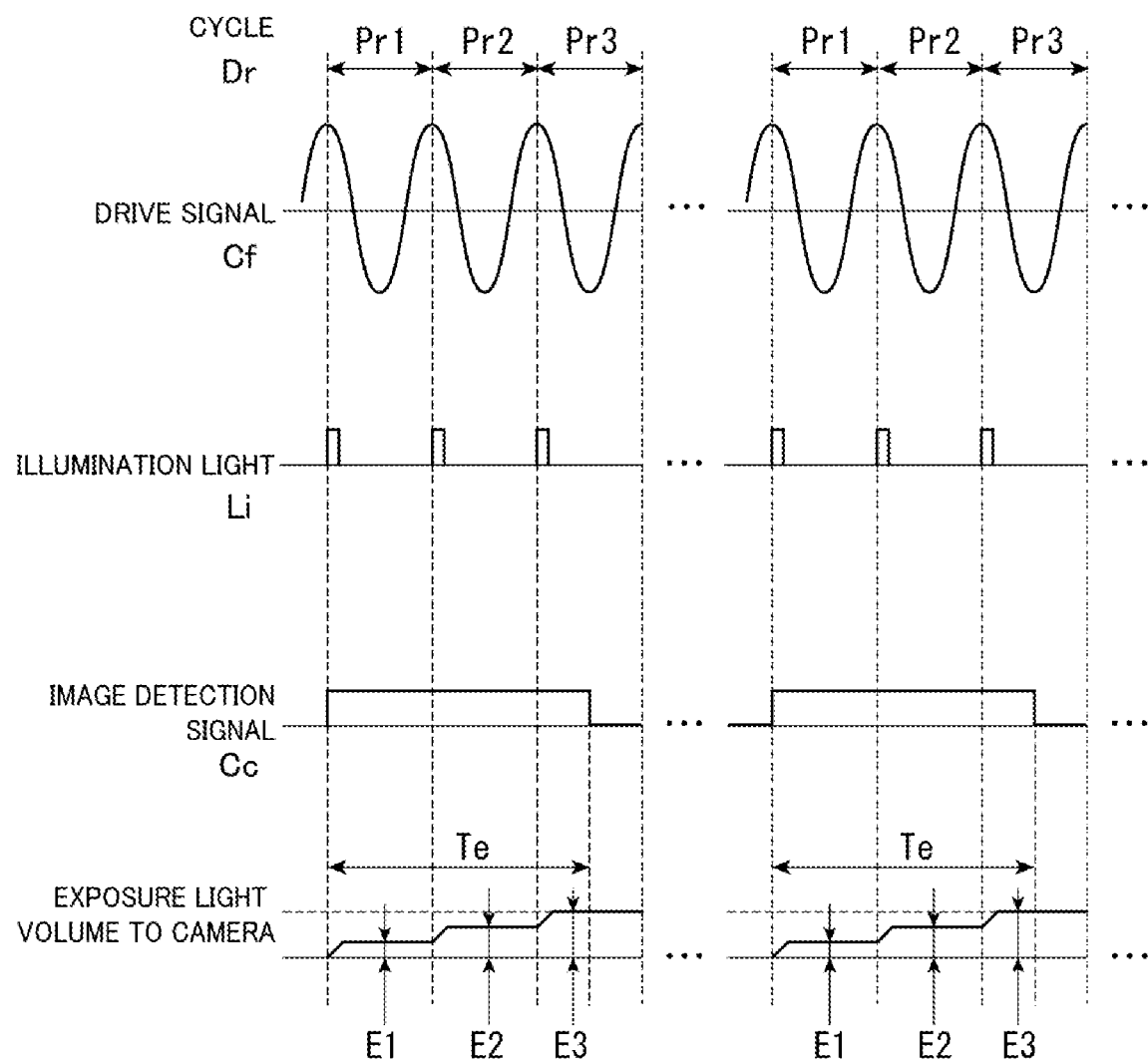
FIG. 6 shows operation timings in the second exemplary embodiment.

As shown in FIG. 6, while the pulsed illuminator 5 emits the pulsed illumination light Li in each cycle Pr of the drive signal Cf, the image detector 4 is brought into a state for the image detection in response to the image detection signal Cc from the light volume adjustor 631, whereby the image detector 4 performs the image detection in accordance with the illumination light Li. Supposing that the image detector 4 receives exposure light volume E for a single shot of the illumination light Li, when the illumination light Li is emitted for a plurality of times during the exposure duration Te specified by the image detection signal Cc, the exposure light volume E of the image detector 4 is cumulated by the plurality of times. Specifically, an exposure light volume E1 in the first cycle Pr1 is cumulated to reach an exposure light volume E2 in the second cycle Pr2 and an exposure light volume E3 in the third cycle Pr3. In order for the exposure light volume E3 to reach a predetermined required light volume Er, it is only required that the illumination light Li is emitted for the plurality of times during the exposure duration Te.

As described above in the exemplary embodiment, the light volume of the pulsed illumination by the pulsed illuminator 5 is adjustable by increasing and decreasing the number of the illumination light Li for the pulsed illumination. In other words, the increase or decrease in the exposure duration Te (duration for the image detector 4 to detect the detection image Im in one frame) in response to the image detection signal Cc enables the increase or decrease in the number of the illumination light Li emitted during the exposure duration Te, so that a cumulative illumination light volume (exposure light volume E3) can be increased or decreased with a constant light volume (exposure light volume E1) of the illumination light Li for a single shot, whereby the required light volume Er is securely obtainable.

According to the second exemplary embodiment, without requiring the difficult process of, for instance, adjusting the output of the pulsed illuminator 5 in an extremely short time, the adjustment of the light volume pulsed illuminator 5 of the pulsed illuminator 5 can be easily adjusted by adjusting the detection duration for one frame of the images in accordance with the image detection signal Cc.

Further, since the output of the pulsed illuminator 5 can be made constant, the pulsed illumination can always be maintained at the maximum light intensity, which enables to minimize a change in the focal point at the image detection using the liquid resonance type lens system 3.

Other Exemplary Embodiments

It should be noted that the scope of the invention is not limited by the above-described exemplary embodiments, but encompasses modifications, improvements and the like compatible with an object of the invention.

In the first exemplary embodiment, the illumination controller 62 includes the illumination information 622 storing the required light volume for the to-be-imaged region and adjusts the illumination duration with reference to the illumination information 622 in order to make the pulsed illuminator 5 emit light. However, it is not essential in the invention to store the required light volume at each focal point as the illumination information 622 in advance, but the required light volume may be detected at each time of the illumination or the setting of the to-be-imaged surface.

In the first exemplary embodiment, the illumination controller 62 performs illumination actions (emission of illumination light Li) respectively at a plurality of focal points Pf in different cycles Pr. However, all of the illumination actions may be performed at the plurality of focal points Pf in a single cycle Pr.

In the first exemplary embodiment, the image detection device 1 detects the multi-focus image at the plurality of focal points Pf. However, the image detection device 1 may be a device configured to detect a single-focus image at a single focal point Pf.

In the above exemplary embodiments, the lens controller 6 and the controlling PC 7 are used in combination in order to drive and control the lens system 3. However, the lens controller 6 and the controlling PC 7 may be an integrated device configured to collectively drive, control and operate the lens system 3. However, such a combination of the lens controller 6 and the controlling PC 7 as in the exemplary embodiments allows the use of hardware required for driving and controlling the lens system 3 in a form of an independent dedicated lens control device. Moreover, a highly versatile personal computer is usable for operating and adjusting the setting of the lens controller 6 and further importing an image.

The drive signal Cf, which is in a sinusoidal waveform to cause sinusoidal oscillation at the focal point Pf in the exemplary embodiments, may be a triangular waveform, saw-tooth waveform, rectangular waveform, or the like.

The specific configuration of the lens system 3 may be changed as needed. Not only the configuration described in Patent Literature 1 but also a shape and a sizes of a package or a nature of a liquid to be resonated may be selected as needed.

In addition to the CCD image sensor, the image detector 4 may be an image sensor with use of other solid image-pickup device such as CMOS (Complementary Metal Oxide Semiconductor).

The pulsed illuminator 5 may be LED or other emitting devices such as LD (Laser Diode) or SLD (Super Luminescent Diode) which are switchable at a high speed.

What is claimed is:
1. An image detection device comprising:
a liquid resonant lens system whose focal point is cyclically changeable to define a plurality of focal points;
an image detector configured to detect an image in a to-be-imaged region through the lens system;

a pulsed illuminator configured to emit pulsed light on the to-be-imaged region in synchronization with at least one of the plurality of focal points; and an illumination controller configured to increase or decrease an illumination duration of the pulsed illuminator depending on a required illumination duration for the to-be-imaged region at the at least one of the plurality of focal points where the pulsed illuminator emits the pulsed light.

2. The image detection device according to claim 1, wherein the illumination controller is configured to control the pulsed illuminator to emit the pulsed light to the plurality of focal points, and increase or decrease the illumination duration of the pulsed illuminator depending on the required illumination duration for the to-be-imaged region at each of the plurality of focal points.

3. The image detection device according to claim 2, wherein illumination actions for the plurality of focal points by the illumination controller are performed in different cycles respectively having the plurality of focal points.

4. The image detection device according to claim 1, wherein the illumination controller comprises illumination information storing the required illumination duration for the to-be-imaged surface at each of the focal points, and is configured to adjust the illumination duration with reference to the illumination information when making the pulsed illuminator emit the pulsed light.

5. An image detection device comprising:

a liquid resonant lens system whose focal point is cyclically changeable to define a plurality of focal points;

an image detector configured to detect an image in a to-be-imaged region through the lens system;

a pulsed illuminator configured to emit pulsed light on the to-be-imaged region in synchronization with at least one of the plurality of focal points; and an image detection controller configured to increase or decrease the number of illuminations of the pulsed illuminator within a period for the image detector to detect the image in one frame depending on a required illumination duration for the to-be-imaged region at the at least one of the plurality of focal points where the pulsed illuminator emits the pulsed light.

6. The image detection device according to claim 1, wherein the pulsed illuminator is configured to have a constant output of pulsed light.

7. The image detection device according to claim 5, wherein the pulsed illuminator is configured to have a constant output of pulsed light.

* * * * *